United States Patent
Tewes et al.

(10) Patent No.: US 11,162,286 B2
(45) Date of Patent: Nov. 2, 2021

(54) CLOSING DEVICE FOR A STORAGE COMPARTMENT, STORAGE COMPARTMENT FOR A MOTOR VEHICLE

(71) Applicant: Volkswagen Aktiengesellschaft, Wolfsburg (DE)

(72) Inventors: Lars Tewes, Wahrenholz (DE); Karsten Knoll, Boeckwitz (DE); Burkhard Gis, Ruehen (DE); Michael Deumann, Bad Bodenteich (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 98 days.

(21) Appl. No.: 16/725,832

(22) Filed: Dec. 23, 2019

(65) Prior Publication Data
US 2020/0199926 A1    Jun. 25, 2020

(30) Foreign Application Priority Data

Dec. 21, 2018 (DE) .................... 10 2018 222 778.0

(51) Int. Cl.
*B60R 13/00* (2006.01)
*E05F 1/16* (2006.01)
*E05F 11/08* (2006.01)
*B60R 7/00* (2006.01)

(52) U.S. Cl.
CPC .............. *E05F 1/16* (2013.01); *E05F 11/08* (2013.01); *B60R 7/00* (2013.01); *E05Y 2201/688* (2013.01)

(58) Field of Classification Search
CPC .. B60R 7/00; B60R 7/005; B60R 7/04; B60R 7/08; E05B 83/32; E05C 3/02

USPC ....................................................... 296/24.34
See application file for complete search history.

(56) References Cited

U.S. PATENT DOCUMENTS

| | | | |
|---|---|---|---|
| 6,168,059 B1 * | 1/2001 | Salenbauch | B60R 7/04 220/345.5 |
| 6,478,204 B2 | 11/2002 | Lange et al. | |
| 6,499,785 B2 * | 12/2002 | Eguchi | B60R 7/04 160/201 |
| 7,168,669 B2 | 1/2007 | Park | |
| 7,540,391 B2 * | 6/2009 | Kato | B60R 7/04 220/252 |

(Continued)

FOREIGN PATENT DOCUMENTS

| DE | 19824248 A1 | 12/1999 |
|---|---|---|
| DE | 10359294 A1 | 5/2005 |

(Continued)

*Primary Examiner* — Jerry E Redman
(74) *Attorney, Agent, or Firm* — Muncy, Geissler, Olds & Lowe, P.C.

(57) ABSTRACT

A closing device for a storage compartment, in particular of a motor vehicle, having a closing element, slidable on a frame, for releasing or closing a frame opening of the frame, and a locking device for locking the closing element in at least one sliding position, wherein the locking device has at least one actuating handle, which is disposed on the closing element and projects from the closing element for gripping, and is coupled to the locking device for locking and releasing the locking. It is provided that the actuating handle is disposed displaceable on the closing element only in one plane, in particular parallel to the frame. The invention further relates to a storage compartment for a motor vehicle with such a closing device.

14 Claims, 2 Drawing Sheets

(56) References Cited

U.S. PATENT DOCUMENTS

| | | | |
|---|---|---|---|
| 7,735,538 B2 * | 6/2010 | Ogawa | E06B 9/15 160/230 |
| 8,235,567 B2 * | 8/2012 | Hipshier | B60R 7/04 362/488 |
| 8,573,665 B2 * | 11/2013 | Hipshier | B60Q 3/225 296/24.34 |
| 8,925,616 B2 * | 1/2015 | Ganz | B60N 3/08 160/231.2 |
| 9,016,751 B2 * | 4/2015 | Zoehrens | B60R 7/06 296/37.8 |
| 9,481,323 B2 * | 11/2016 | Hipshier | B60R 13/0262 |
| 10,196,001 B2 * | 2/2019 | Gillis | B60R 7/04 |
| 10,604,974 B2 * | 3/2020 | Anderson | E05B 83/32 |
| 10,730,442 B2 * | 8/2020 | Kim | B60R 7/04 |
| 10,807,537 B2 * | 10/2020 | Englert | B60R 5/048 |
| 2004/0130174 A1 * | 7/2004 | Laskey | B60R 7/04 296/37.1 |
| 2008/0179894 A1 | 7/2008 | Chuang | |
| 2015/0151656 A1 * | 6/2015 | Bozio | B60R 7/04 296/24.34 |
| 2015/0184445 A1 * | 7/2015 | Lin | B60R 7/04 220/200 |
| 2015/0197201 A1 * | 7/2015 | Greiner | B60R 7/08 296/24.34 |
| 2015/0258923 A1 * | 9/2015 | Skapof | B60N 2/753 296/24.34 |
| 2015/0258939 A1 * | 9/2015 | Hipshier | B60R 7/04 160/229.1 |
| 2015/0337572 A1 * | 11/2015 | Tsalenko | B60R 7/04 292/138 |
| 2016/0339847 A1 | 11/2016 | Kodama et al. | |
| 2016/0339848 A1 * | 11/2016 | Hodgson | B60R 11/00 |
| 2016/0340942 A1 * | 11/2016 | Anderson | B60R 7/04 |
| 2017/0050572 A1 * | 2/2017 | Anderson | B60R 7/046 |
| 2018/0118121 A1 * | 5/2018 | Gorman, Jr. | B29C 69/02 |
| 2018/0194295 A1 * | 7/2018 | Jones | E05B 83/32 |

FOREIGN PATENT DOCUMENTS

| | | |
|---|---|---|
| DE | 202006002100 U1 | 6/2007 |
| DE | 102008015161 A1 | 9/2009 |
| DE | 102012006719 A1 | 10/2013 |
| DE | 102014218412 A1 | 3/2016 |
| JP | 2011252321 A | 12/2011 |
| KR | 1020040043461 A | 5/2004 |
| KR | 200391927 Y1 | 8/2005 |

* cited by examiner

CLOSING DEVICE FOR A STORAGE COMPARTMENT, STORAGE COMPARTMENT FOR A MOTOR VEHICLE

This nonprovisional application claims priority under 35 U.S.C. § 119(a) to German Patent Application No. 10 2018 222 778.0, which was filed in Germany on Dec. 21, 2018, and which is herein incorporated by reference

BACKGROUND OF THE INVENTION

Field of the Invention

The present invention relates to a closing device for a storage compartment, in particular of a motor vehicle, comprising a closing element, slidable on a frame, for releasing or closing a frame opening of the frame, and a locking device for locking the closing element in at least one sliding position, wherein the locking device has at least one actuating handle, which is disposed on the closing element and projects from the closing element for gripping. Further, the invention relates to a storage compartment for a motor vehicle, with an especially trough-shaped tray and a closing device, associated with the tray, for releasing and closing the tray.

Description of the Background Art

Closing devices and storage compartments of the aforementioned type are already known from the prior art. Thus, the unexamined German patent application DE 10 2008 015 161 A1 describes a generic closing device which has a roller blind element, which is slidable in a frame and at one end carries an actuating handle which projects at least substantially perpendicularly from the plane of the rolled-out roller blind, so that the user can easily grasp the actuating handle at any time and thereby can move the roller blind along the frame to release or close an opening.

A further storage compartment with an associated roller blind as a closing element for releasing or closing the storage compartment is known from DE 10 2014 218 412 A1. At its free end, the roller blind has a pivotable end element, which in the closed position also closes the opening, and can be pivoted to release the function of a cup holder and during pivoting also to determine the sliding position of the roller blind on the frame.

A cup holder is known further from the utility model DE 20 2006 002 100 U1 with a diameter-compensating element which is slidable in order to change a mounting diameter of the cup holder. The compensating element has a pivotable actuating handle, which is pivotable for locking or unlocking the diameter-compensating element in a sliding position.

SUMMARY OF THE INVENTION

It is therefore an object of the present invention to provide an improved closing device that allows the user to operate it easily and in particular indicates to the user in a simple manner whether or not the closing element is locked in the current sliding position.

The object on which the invention is based is achieved by a closing device according to an exemplary embodiment. This has the advantage that the user is offered an intuitive operation of the actuating handle, which, on the one hand, makes it easier for him to operate the locking device and, on the other, visually shows whether the closing element is locked or not. According to the invention, this is achieved in that the actuating handle is disposed displaceable on the closing element only in one plane, in particular parallel to the frame. Thus, the actuating handle can be moved between different positions, which are visually easy to recognize. In addition, the movement only in one plane, in particular parallel to the frame, results in simple kinematics, by which the actuating handle is connected to the locking device. A movement in only one plane parallel to the frame is understood herein as a movement that takes place in a plane that is parallel to the plane of the frame or the frame opening and thus also parallel to the closing element, at least when it is in the sliding position closing the frame opening. The slidable closing element is preferably a roller blind which, when moved into the position releasing the frame opening, is pushed in the direction of one end of the frame in the plane or parallel thereto and rolled up at the end of the frame or the storage compartment for space-saving storage.

The actuating handle can be mounted translationally slidable on the closing element. As a result, the actuating handle is slidable overall in the plane, which results in a simple operation with a direct force transmission to the locking device.

The actuating handle can be mounted slidable parallel to the sliding direction of the closing element. As a result, the use of the closure device is particularly intuitive for the user, because he can move the actuating handle both for locking or releasing the locking as well as for sliding the closing element. Optionally, the actuating handle can be formed in two parts, with a displaceable actuating body and with a holding body or guide element which is fixedly disposed on the closing element and in which the actuating body is mounted slidably or movable in the plane.

The actuating handle can be mounted on a guide element fixedly disposed on the closing element. As a result, the actuating handle is not mounted directly on the closing element but on the guide element. The guidance for the actuating handle is improved hereby and is formed structurally simpler. In particular, this results in a robust embodiment of the closing device.

Furthermore, the actuating handle can have at least one actuating element which reaches through the closing element and which works together with a locking element of the locking device. The kinematic connection to the locking element is thus created by the actuating element, so that the locking element is actuated by actuation of the actuating handle, or by displacing the actuating handle in a plane parallel to the frame. The locking element is designed as part of the locking device to lock the closing element on the frame or to release the locking. Optionally, the actuating element is designed to apply a force to the locking element in only one direction, wherein the locking element is acted upon in the opposite direction by a return spring with a restoring force, so that the locking element is held between the return spring and the actuating element. This helps in the guiding of the actuating element and reduces noise during operation, which can otherwise occur due to the collision of the actuating element and locking element. In addition, this ensures that after actuation the locking element automatically returns to its initial position. Alternatively, the actuating handle is coupled to the locking element by the actuating element such that the actuating handle brings about a forced guidance of the locking element, so that the position of the locking element always corresponds to a position of the actuating handle.

The locking element can be designed as a pivotally mounted locking hook or latching hook. The hook-shaped design of the locking element ensures a simple locking of the sliding element on the frame.

In particular, the locking element can be designed to work together with a counter element, fixedly disposed on the frame, for locking the sliding element. Thus, for example, the counter element is a recess or depression in the frame in which the locking element can engage. The locking of the sliding element is brought about thereby simply and robustly directly by the locking element which engages in the frame.

The locking element can have at least one actuating section which is associated with the actuating element and against which the actuating element can be moved for locking or for releasing the locking. Thus, the movement of the locking element in at least one direction is ensured by a touch contacting of the actuating element with the locking element. Preferably, the actuating section is designed such that it has a run-up slope for the actuating element in order to avoid or reduce a hard or noise-generating placement of the actuating element on the actuating section or on the locking element. In particular, the actuating section is designed to work together with the actuating element with little wear. For this purpose, the actuating section has, for example, an advantageous coating or an advantageous material.

The guide element can have at least one, preferably at least two, guide grooves, in which the actuating handle engages with a respective guide part, in particular with a guide pin or rib, for linear guiding. By the interaction of the guide part and the guide groove, a precise linear guiding of the actuating element or the actuating handle on the guide element is ensured simply and inexpensively. According to an alternative embodiment, the guide grooves are formed in the actuating handle and the guide parts on the guide element. A combination of the two variants can also be provided.

The actuating handle can be pivotally mounted in the plane on the closing element. As a result, the user can easily create or release the locking by pivoting the actuating handle in the plane. Due to the rotational movement, a particularly simple actuation takes place, which also makes it possible for the user, for example, to easily move the locking element against the force of a return spring with high spring force, especially due to the leverage effect. The aforementioned embodiments, which have been described for the translational actuating handle, apply equally preferably also to the embodiments of the pivotally mounted actuating handle. Instead of a translational movement of the actuating element, then a rotational movement of the actuating element results for actuating the control element, for example, in the form of an actuating shaft.

The storage compartment of the invention is characterized by a closing device of the invention. This results in the aforementioned advantages.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1A:
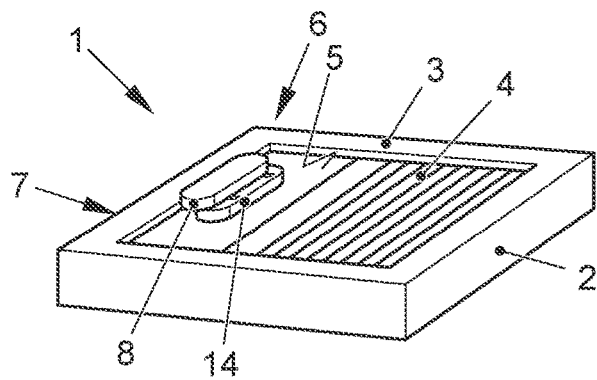
FIGS. 1A and 1B show an exemplary embodiment of an advantageous closing device for a storage compartment.
Figure 1B:
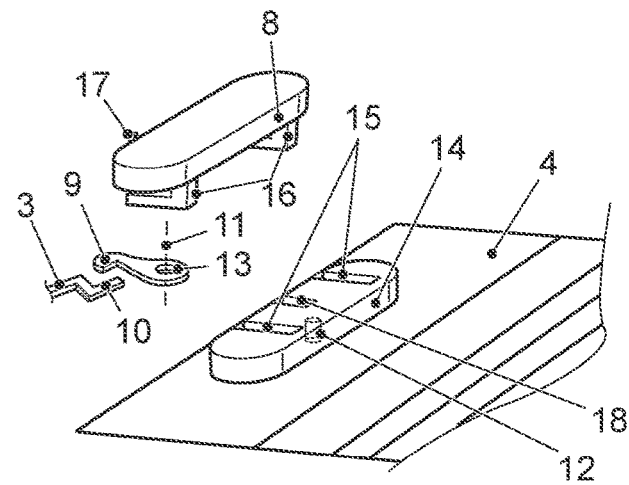

FIGS. 1A and 1B show an exemplary embodiment of an advantageous storage compartment 1 for a motor vehicle, wherein FIG. 1A shows a perspective view and FIG. 1B shows a simplified exploded view.

Storage compartment 1 has an trough-shaped tray 2, for example, which is closed towards its upper opening by a frame 3, which carries a slidable closing element 4 for releasing or closing a frame opening 5 of the frame. Closing element 4 in the present case is designed as a roller blind, which is slidably mounted in lateral guide rails of frame 3. At one end of frame 3, the roller blind is rollable in a known manner (not shown in the figures).

Frame 3, together with closing element 4, forms an advantageous closing device 6 for releasing or closing tray 2. In order to lock closing element 4 in a sliding position, in particular in the sliding position closing storage compartment 1, as shown in FIG. 1A, closing device 6 has a locking device 7. This is formed by a displaceable actuating handle 8, by a locking element 9, which is actuatable by actuating handle 8 and which is formed in the present exemplary embodiment, in particular shown in FIG. 1B, as a locking hook, and by a counter element 10 on the frame side.

Locking element 9 is mounted pivotable about a pivot axis 11, which is oriented perpendicular to the plane of closing element 4 or frame 3. For this purpose, a pivot pin 12 is disposed on closing element 4, in particular on its underside, a pivot pin onto which locking element 9 is pushed with a bolt receiver 13. Locking element 9 thus lies on the underside of closing element 4, said side facing tray 2, like counter element 10.

Figure 2A:
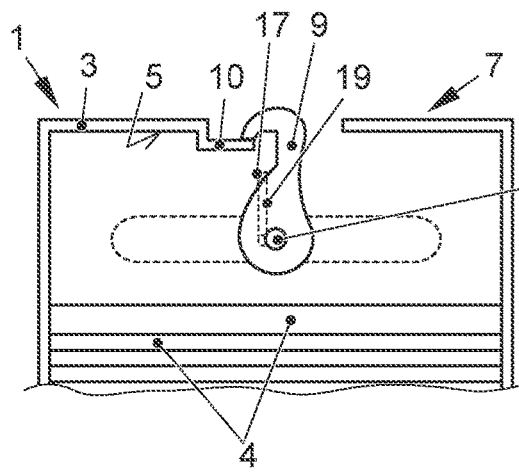
FIGS. 2A and 2B show the locking device according to the exemplary embodiment in different operating states.
Figure 2B:
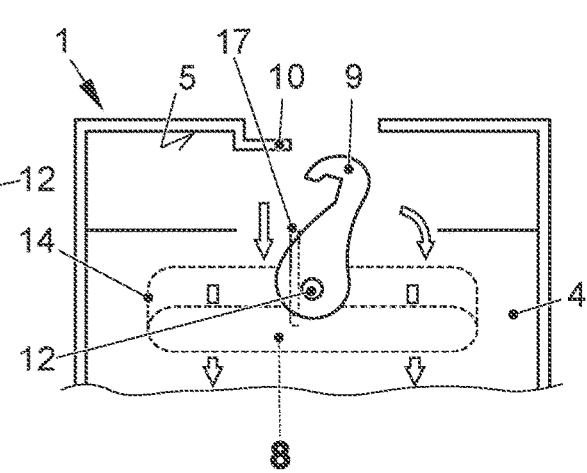

FIGS. 2A and 2B each show a plan view of the underside of closing element 4. It can be seen in FIG. 2A how locking element 9 engages with counter element 10 and thereby prevents in a positive manner a sliding of closing element 4 into an open position.

Actuating handle 8 is mounted translationally displaceable on a guide element 14, which is fixedly connected to closing element 4, so that it is slidable parallel to the plane of closing element 4 or of frame 3, namely in the sliding direction of closing element 4.

As FIG. 1B shows, guide element 14 has a plurality of guide grooves 15 into which guide parts 16 of actuating handle 8 extend. Guide grooves 15 and guide parts 16, in particular guide ribs, are oriented parallel to one another, so that actuating handle 8 is linearly slidable.

Furthermore, actuating handle 8 has an actuating element 17, which extends through a recess 18, which extends through guide element 14 and closing element 4, to the underside of closing element 4 in order to work together there with locking element 9. As FIG. 2A shows, actuating element 17 works together with an actuating section 19 of locking element 9, such that when actuating handle 8 is displaced in the opening sliding direction of closing element 4, actuating element 17 pivots the locking hook into the release position, so it is outside of engagement with counter element 10, such that closing element 4 is slidable from the closed position shown in FIG. 1A into an open position releasing frame opening 5, as shown in FIG. 2B, which shows the released state of the locking of locking device 7.

Figure 3:
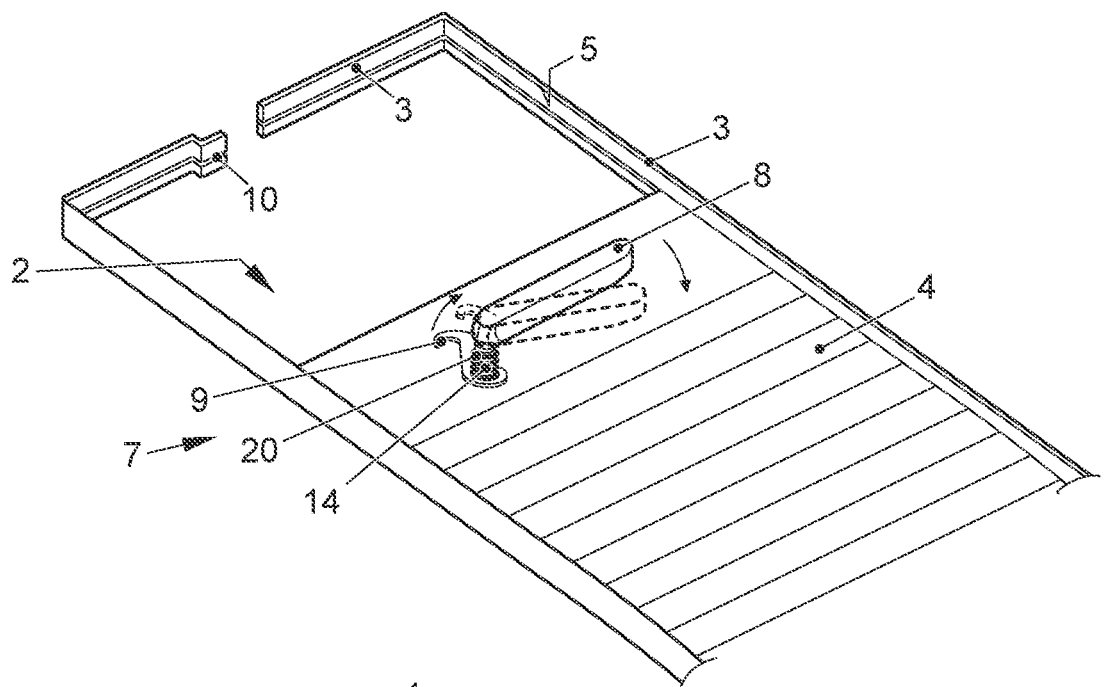
FIG. 3 shows an exemplary embodiment of the closing device.

FIG. 3 shows an exemplary embodiment of the advantageous closing system 1, which differs from the previous exemplary embodiment in that actuating handle 8 is not translationally displaceable, but is mounted pivotable in the plane parallel to frame 3. The pivot axis is oriented perpendicular to the plane of frame 3 or in particular vertically. Actuating element 17 is designed in this case as an actuating shaft which is rotatably connected to locking element 9 in order to displace it for locking or for releasing the locking, as shown by arrows in FIG. 3.

In this case, actuating handle 8 is also associated with a return spring 20 which is formed in the present exemplary embodiment as a coil spring or spiral spring and acts between actuating handle 8 and closing element 4 and/or guide element 14. Guide element 14 is formed in this case with a bearing seat for the rotary mounting of actuating handle 8 and serves as a support for return spring 20.

Figure 4:
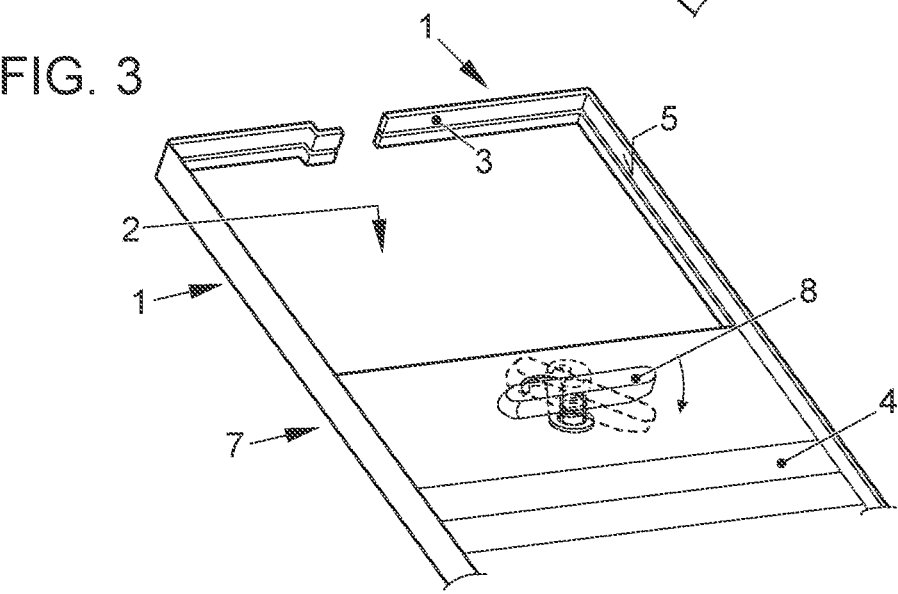
FIG. 4 shows an exemplary embodiment of the closing device.

FIG. 4 shows an exemplary embodiment of closing system 1, which differs from the previous exemplary embodiment in that the actuating handle is not pivotally mounted at one end, but centrally.

Figure 5:
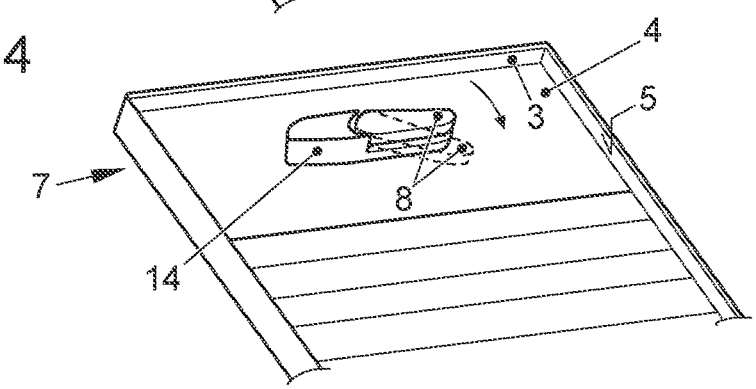
FIG. 5 shows an exemplary embodiment of the closing device.

FIG. 5 shows an exemplary embodiment of an advantageous closing device 1, which differs from the preceding exemplary embodiment in that the actuating handle is indeed mounted pivotally at one end, however, but in this case the axis of rotation is disposed centrally on closing element 4 with respect to the width of closing element 4, and actuating handle 8 is extended in the direction, facing away from the free end of actuating handle 8, by raising guide element 14 so that actuating handle 8 appears to be wider than it is, and wherein the fixed portion, formed by guide element 14, allows easier operation of closing element 4 because guide element 14 is fixedly connected to closing element 4.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed:

1. A closing device for a storage compartment of a motor vehicle, the closing device comprising:
 a closing element slidable on a frame for releasing or closing a frame opening of the frame; and
 a locking device for locking the closing element in at least one sliding position, the locking device having at least one actuating handle, which is disposed on the closing element and projects from the closing element for gripping, and is coupled to the locking device for locking and releasing the locking device,
 wherein the actuating handle is disposed displaceable on the closing element only in one plane or parallel to the frame, and
 wherein the actuating handle has at least one actuating element that extends through the closing element and works together with a locking element of the locking device.

2. The closing device according to claim 1, wherein the actuating handle is mounted translationally slidable on the closing element.

3. The closing device according to claim 1, wherein the actuating handle is mounted slidable parallel to the sliding direction of the closing element.

4. The closing device according to claim 1, wherein the actuating handle is mounted on a guide element fixedly disposed on the closing element.

5. The closing device according to claim 4, wherein the guide element has at least one guide groove in which a respective guide part of the actuating handle engages for a linear guiding of the actuating handle.

6. A closing device for a storage compartment of a motor vehicle, the closing device comprising:
 a closing element slidable on a frame for releasing or closing a frame opening of the frame; and
 a locking device for locking the closing element in at least one sliding position, the locking device having at least one actuating handle, which is disposed on the closing element and projects from the closing element for gripping, and is coupled to the locking device for locking and releasing the locking device,
 wherein the actuating handle is disposed displaceable on the closing element only in one plane or parallel to the frame, and
 wherein the actuating handle is pivotally mounted on the closing element, such that the actuating handle rotates to lock and release the locking device.

7. A storage compartment for a motor vehicle, with a trough-shaped tray and the closing device according to claim 1, wherein the closing device is associated with the tray for releasing or closing an opening of the tray.

8. The closing device according to claim 1, wherein the locking element is a pivotally mounted locking hook or latching hook.

9. The closing device according to claim 1, wherein the locking element is designed to work together with a counter element, fixedly disposed on the frame, for locking the closing element.

10. The closing device according to claim 1, wherein the locking element has at least one actuating section, which is associated with the actuating element and against which the actuating element is moved for locking or releasing the locking device.

11. The closing device according to claim 6, wherein the locking device includes a locking element that is a pivotally mounted locking hook or latching hook, and wherein the actuating handle and the locking element are associated with a return spring.

12. The closing device according to claim 4, wherein the at least one actuating element of the actuating handle extends through both the closing element and the guide element.

13. The closing device according to claim 4, wherein the guide element is fixedly disposed on an upper surface of the closing element, the actuating handle is disposed on an upper surface of the guide element and the locking element is disposed at a bottom surface of the closing element, and wherein the upper surface of the closing element and the upper surface of the guide element face away from an interior space surrounded by the frame and the bottom surface of the closing element faces the interior space surrounded by the frame.

14. The closing device according to claim 1, wherein the locking element pivots about a pivot pin that protrudes from a bottom surface of the closing element, the bottom surface facing an interior space surrounded by the frame.

\* \* \* \* \*